US009725947B2

(12) United States Patent
Seehof

(10) Patent No.: US 9,725,947 B2
(45) Date of Patent: Aug. 8, 2017

(54) ROLL UP DOOR ASSEMBLY WITH ORIENTABLE ILLUMINATION

(71) Applicant: Hansen International, Inc., Lexington, SC (US)

(72) Inventor: John J. Seehof, Blythewood, SC (US)

(73) Assignee: Hansen International, Inc., Lexington, SC (US)

( * ) Notice: Subject to any disclaimer, the term of this patent is extended or adjusted under 35 U.S.C. 154(b) by 0 days.

(21) Appl. No.: 14/242,243

(22) Filed: Apr. 1, 2014

(65) Prior Publication Data

US 2014/0318718 A1 Oct. 30, 2014

Related U.S. Application Data

(60) Provisional application No. 61/815,356, filed on Apr. 24, 2013.

(51) Int. Cl.
*B60Q 1/26* (2006.01)
*E06B 7/28* (2006.01)
*E06B 9/06* (2006.01)
*B60J 5/08* (2006.01)
*B60Q 1/32* (2006.01)
*B60Q 3/30* (2017.01)
*E06B 9/24* (2006.01)

(52) U.S. Cl.
CPC ............... *E06B 7/28* (2013.01); *B60J 5/08* (2013.01); *B60Q 1/2669* (2013.01); *B60Q 1/323* (2013.01); *B60Q 3/30* (2017.02); *E06B 9/06* (2013.01); *E06B 9/0638* (2013.01); *E06B 2009/0684* (2013.01); *E06B 2009/247* (2013.01)

(58) Field of Classification Search
CPC ...... B60Q 1/2669; B60Q 3/0233; B60Q 3/30; B60Q 1/323; E06B 7/28; E06B 9/0638; E06B 2009/247; E06B 2009/0684; B60J 5/08
USPC ................................. 160/127, 201; 362/501
See application file for complete search history.

(56) References Cited

U.S. PATENT DOCUMENTS

| 5,779,228 | A | 7/1998 | Hansen | |
|---|---|---|---|---|
| 5,944,406 | A | 8/1999 | Hansen | |
| 6,431,643 | B2 * | 8/2002 | Grey | ............................ 296/214 |
| 7,226,191 | B1 * | 6/2007 | Martinez | ....................... 362/400 |
| D647,213 | S | 10/2011 | Seehof | |
| D647,630 | S | 10/2011 | Seehof et al. | |
| D647,631 | S | 10/2011 | Seehof | |
| D648,039 | S | 11/2011 | Seehof | |
| 8,695,675 | B2 * | 4/2014 | Kim | ........................ B60Q 3/30 160/10 |

(Continued)

*Primary Examiner* — Blair M Johnson
(74) *Attorney, Agent, or Firm* — JK Intellectual Property Law, PA

(57) ABSTRACT

A lighted roll up door assembly may include a roll up door including interconnected slats movable along tracks, and a lighting element configured to be attached to an exterior side of the roll up door. The lighting element can be mounted so as to direct a substantial portion of the light output toward the roll up door and below a horizontal direction so as to light a portion of the door and an adjacent area below the door at least partially by reflection when the door is in a closed position and so as to light an area on an interior side of the roll up door when the door is in a opened position. The lighting element may be mounted to a fixed or movable member attached to a slat of the roll up door.

13 Claims, 5 Drawing Sheets

(56) References Cited

U.S. PATENT DOCUMENTS

| | | | |
|---|---|---|---|
| 8,876,324 B2 | 11/2014 | Seehof | |
| 9,440,590 B1* | 9/2016 | Huelke | .................... B60N 3/00 |
| 2005/0219854 A1* | 10/2005 | Grady | ........................... 362/490 |
| 2010/0321945 A1* | 12/2010 | Lang et al. | ................... 362/501 |
| 2014/0262056 A1* | 9/2014 | Blair | ................................ 160/5 |
| 2014/0318718 A1* | 10/2014 | Seehof | ......................... 160/127 |

* cited by examiner

ROLL UP DOOR ASSEMBLY WITH ORIENTABLE ILLUMINATION

RELATED APPLICATIONS

This application claims filing benefit of U.S. Provisional Patent Application Ser. No. 61/815,356 having a filing date of Apr. 24, 2013, which is incorporated herein by reference in its entirety.

TECHNICAL FIELD

The present disclosure relates to a lighted roll up door assembly adapted for use, for example, on fire, rescue and commercial vehicles. The light can be directed to specific desired locations relative to the door assembly and vehicle, both when the door is opened and closed.

BACKGROUND

Fire, rescue and commercial vehicles often have numerous compartments for carrying equipment. Those compartments are typically located on the sides or backs of the vehicles, behind the passenger cab. The compartments generally have doors. Some doors pivot on hinges, and some roll up. Typical roll up doors include a number of slats that are hingedly mounted to each other so as to run in tracks on the sides of the compartment. When the door is lifted, the slats roll into a spiral shape at the top of the compartment. Fixed handles and pivotal handles can be provided near the bottom slats of the door for raising and lowering the door.

Lighting has been provided to the interior of compartments of such vehicles in various ways, such as by mounting lighting elements to inner side walls or a ceiling wall of the compartment, or to the side tracks for guiding the slats. Such lighting does not extend outside of the compartment or provide any benefit to a user when the door is closed. Accordingly, improved lighting for roll up doors and the related environs would be welcome.

SUMMARY

The disclosure is directed to a roll up door assembly that provides a selective orientation of light to a desired location relative to the assembly. The lighting can provide assistance with finding the handle, lighting the door, sill, or compartment interior, and/or providing adjacent lighting, such as ground or other vehicle surface lighting.

According to certain aspects of the disclosure, a lighted roll up door assembly may include a roll up door including interconnected slats movable along tracks, and a lighting element configured to be attached to an exterior side of the roll up door. The lighting element can be mounted so as to direct a substantial portion of the light output toward the roll up door and below a horizontal direction so as to light a portion of the door and an adjacent area below the door at least partially by reflection when the door is in a closed position and so as to light an area on an interior side of the roll up door when the door is in a opened position. The lighting element may be mounted to a fixed or movable member attached to a slat of the roll up door. Various options and modifications are possible.

BRIEF DESCRIPTION OF THE DRAWINGS

More details of the present disclosure are set forth in the drawings.

DETAILED DESCRIPTION

Figure 1:
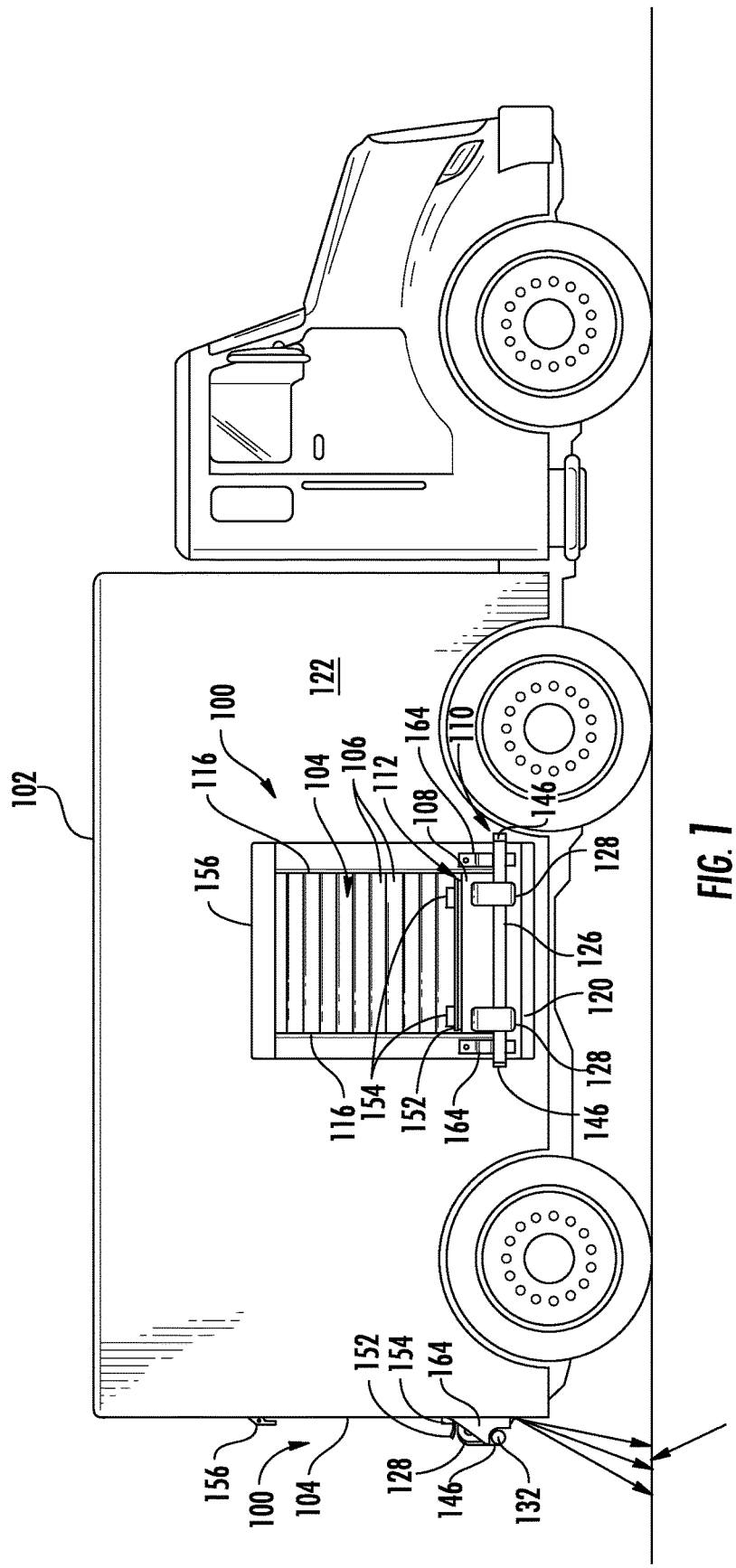
FIG. 1 is a side view of a lighted roll up door assembly according to certain aspects of the invention with two doors, both closed.
Figure 2:
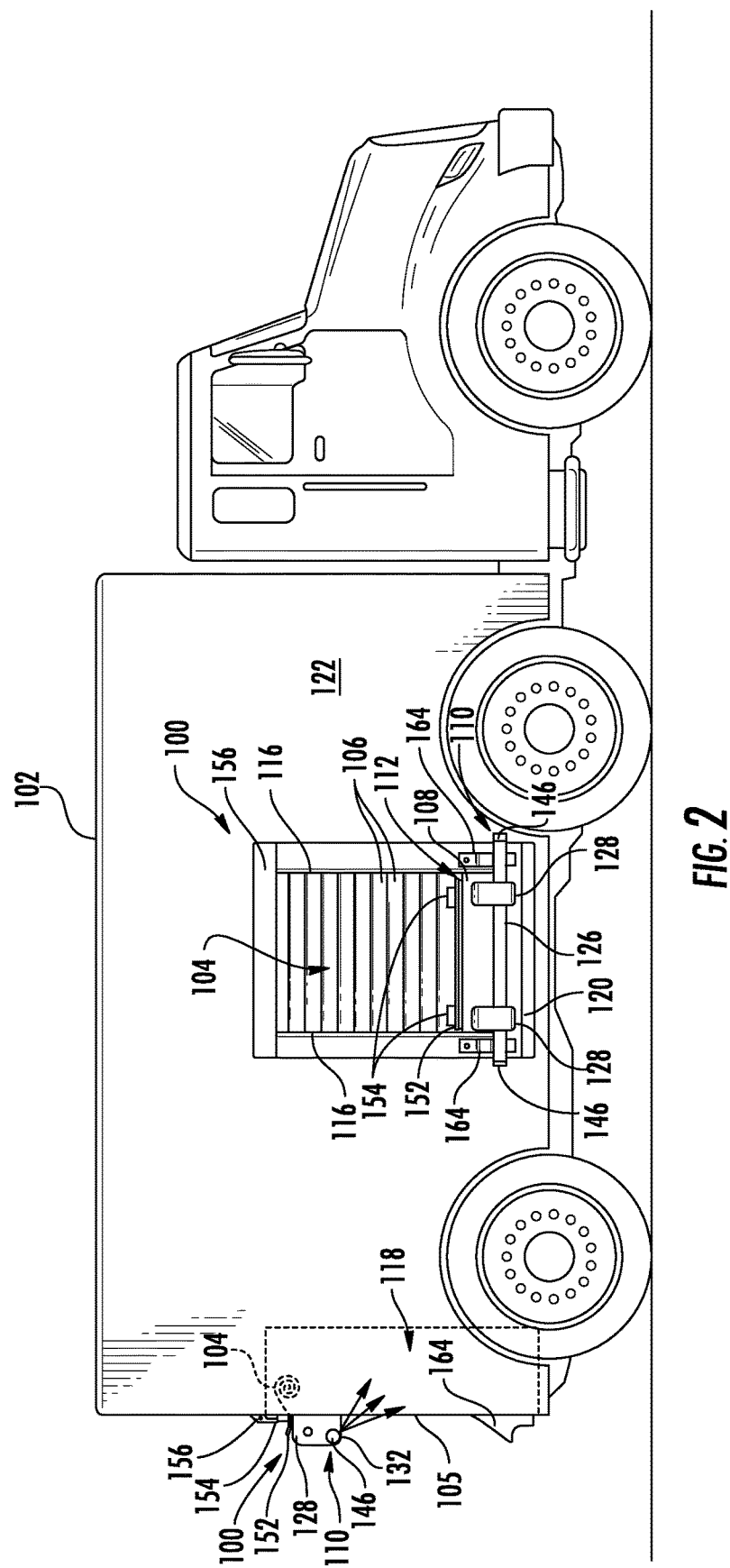
FIG. 2 is a side view as in FIG. 1, with the rear door opened.

Detailed reference will now be made to the drawings in which examples embodying the present disclosure are shown. The detailed description uses numeral and letter designations to refer to features in the drawings. Like or similar designations in the drawings and description have been used to refer to like or similar parts of the disclosure.

The drawings and detailed description provide a full and enabling description of the disclosure and the manner and process of making and using it. Each embodiment is provided by way of explanation of the subject matter not limitation thereof. In fact, it will be apparent to those skilled in the art that various modifications and variations may be made to the disclosed subject matter without departing from the scope or spirit of the disclosure. For instance, features illustrated or described as part of one embodiment may be used with another embodiment to yield a still further embodiment.

Figure 3:
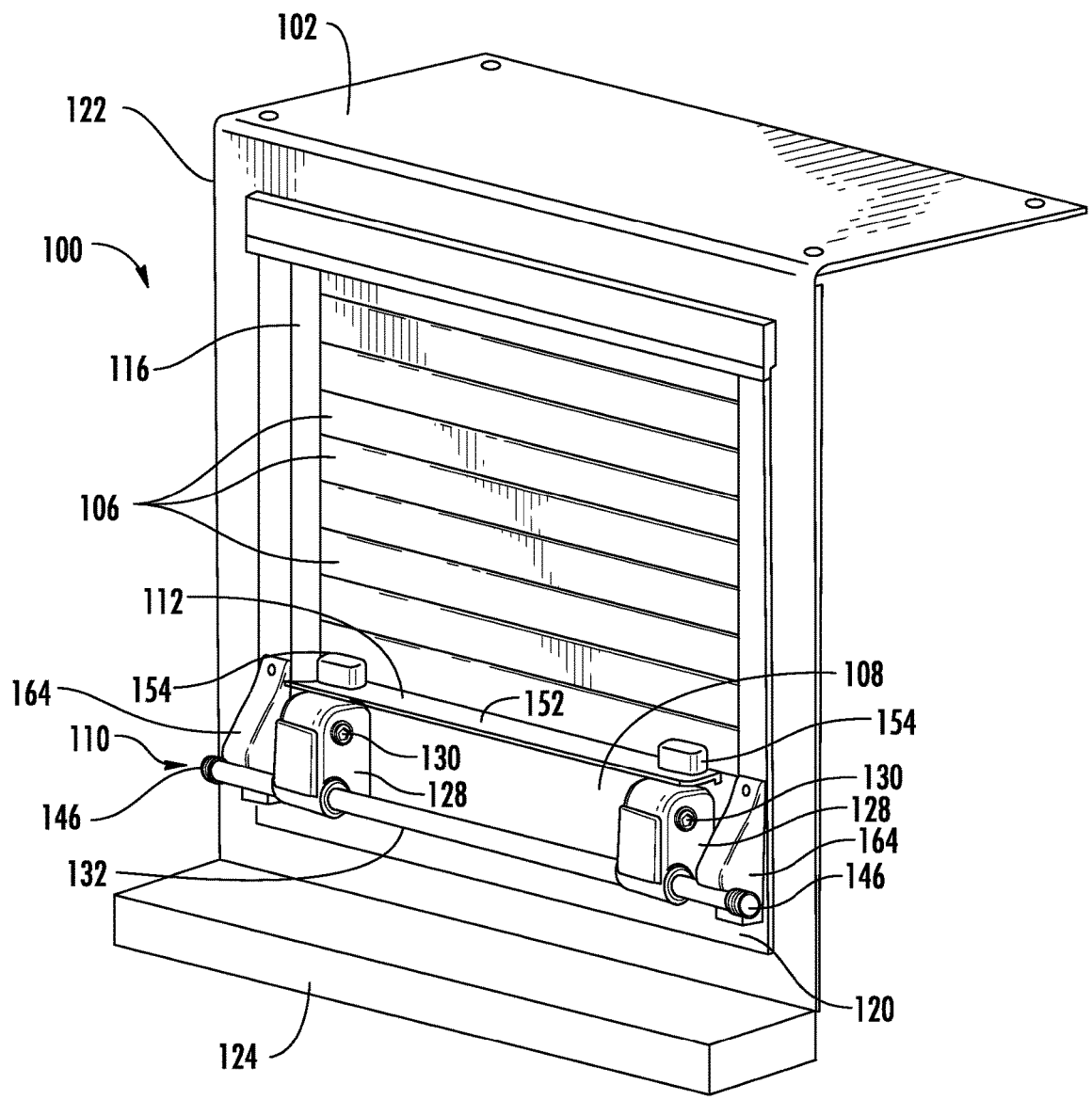
FIG. 3 is a perspective view of one lighted roll up door assembly as in FIG. 1.
Figure 4:
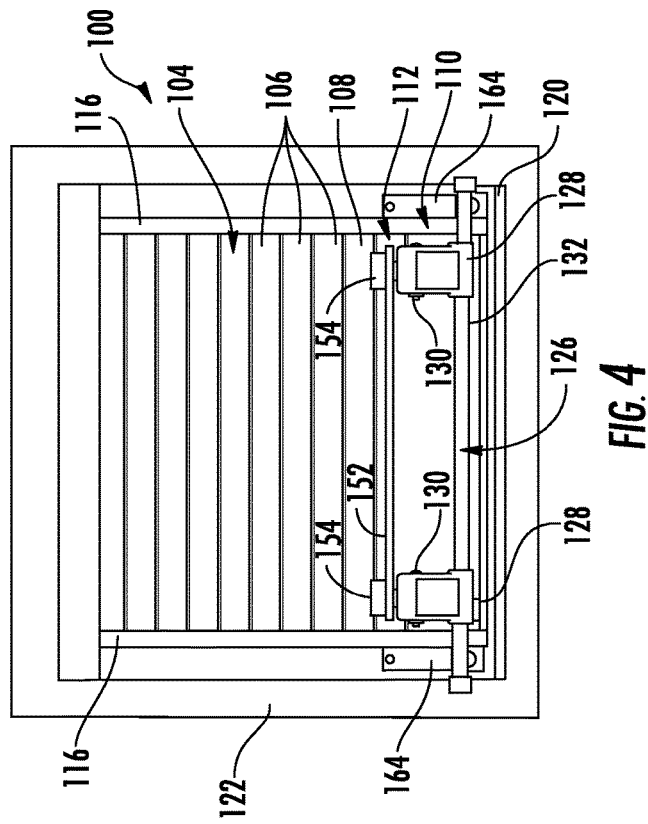
FIG. 4 is a front view of the assembly of FIG. 3.
Figure 6:
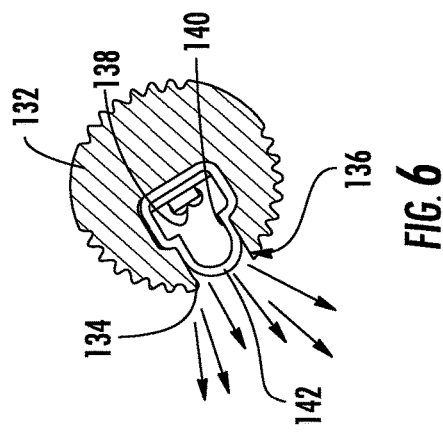
FIG. 6 is an enlarged view of the bar of FIG. 5 showing a cavity containing a lighting element.
Figure 5:
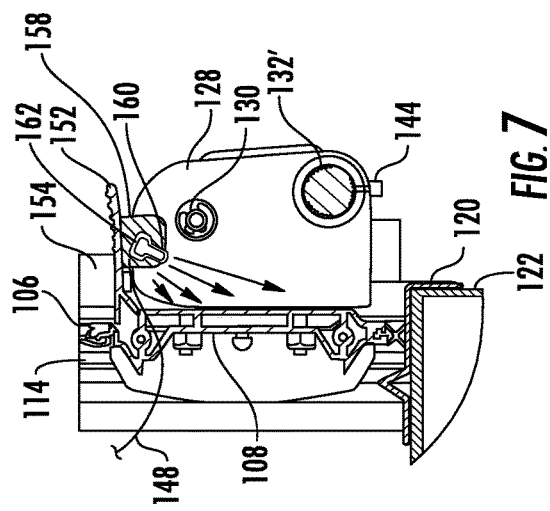
FIG. 5 is a sectional view taken along line 5-5 of FIG. 4.

As shown in FIGS. 1-6, a first embodiment of a roll up door assembly 100 is mounted to an exemplary schematic vehicle 102, which could be a fire, rescue, commercial or other type of vehicle. Door assembly 100 includes a door 104 having a plurality of joined slats 106 for closing an opening 105. Bottom slat 108 is generally larger and may include handles 110 and/or 112, as discussed below. Slats 106 ride in tracks 114. Sealing members 116 may be provided on sides of door assembly 100 to keep dirt and moisture out of tracks 114 and the compartment 118 covered by door assembly 100. The bottom of door opening 105 may include a sill 120, which may be flush with outer walls 122 of vehicle 102 (as shown). Alternately, as shown in FIG. 3, a shelf 124 may extend outwardly from the bottom of opening 105 or from an area beneath the opening. Shelf 124 may be provided for placing items on it, for standing on it to ride on vehicle 102, and/or for reaching items in compartment 118 or on top of vehicle 102.

Handle assembly 110 includes a member 126 pivotally mounted to slat 108 via two pivot blocks 128. Axles 130 through blocks 128 are attached to slat 108 to allow the pivoting. Member 126 may be an extrusion such as a bar 132. Bar 132 has a cavity 134 at least in part of its length, for example between blocks 128, to receive a lighting element 136. Lighting element 136 could be a strip light including one or more lighting members 138, such as incandescent, fluorescent, or as shown, LED's within a housing 140. The housing 140 can be extruded plastic cooperatively sized to fit in cavity 134. Cavity 134 and housing 140 can have shapes other than the shapes shown here. Housing 140 has an exterior portion 142 which can, if desired, diffuse, focus or otherwise direct light from the lighting members as desired.

Bar 132 can be held in blocks in various conventional ways such as by a set screw 144, rivet, interlocking structures, etc. Bar 132 may have end caps 146 if it is extruded and/or if cavity 134 extends to ends of the bar so as to protect lighting element 136. Electricity may be supplied to lighting element 136 via conventional wiring 148 that passes though one or both blocks 128 from a rear side of door 104.

Bar 132 and/or cavity 134 are oriented so that light from element 136 is emitted in a direction generally toward door 100. Also, light can be emitted generally downward. Therefore, a beam of, for example 30-90 degrees (perhaps with some diffusion at edges), can be emitted by lighting element 136 and is directed generally toward and with a center or substantial portion generally below the horizontal. Such direction has several benefits.

First, lighting of such type allows a user to identify and find the handle for actuating the door when closed or opened. Second, such direction provides lighting to an inside compartment when the door is opened (see FIG. 2). Third, such lighting can also provide light to a fixed shelf 124 outside of compartment 105, a movable shelf 150 movable from inside the compartment to a location outside the compartment (see FIGS. 8 and 10), or to the ground adjacent the vehicle (see FIG. 1). Reflection of some light off slats 106 and/or 108 can help light adjacent areas, shelves, etc., as well.

Handle assembly 112 is a fixed element. It can be extruded as part of slat 108 or the bottom slat 106, or may be attached to either. As shown, handle assembly 112 includes a plate like member 152 attached to a top of bottom slat 108. Bumpers 154, which may be flexible rubber, plastic or the like, may be provided for contacting a top sill 156 of opening 105.

Figure 7:
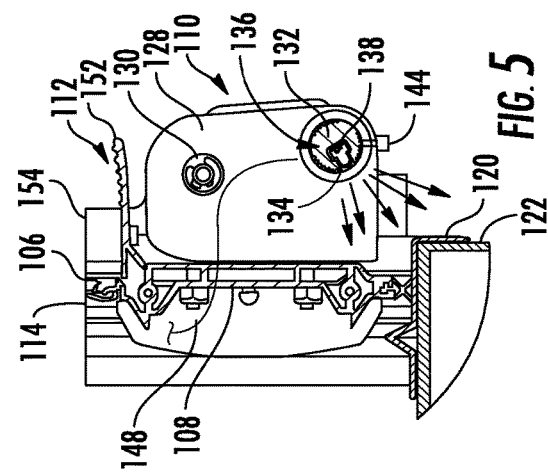
FIG. 7 is an alternate sectional view to that shown in FIG. 5, showing a lighting element in another location.

If desired, as shown in FIG. 7, a lighting element can be attached to handle assembly 112 instead of, or in addition to, the lighting element on handle assembly 110. As shown in FIG. 7, a holding member 158 defines a cavity 160 for receiving a lighting element 162. Holding member 158 may extend only between blocks 128 to avoid interference, although plate-like member 152 could simply be spaced high above the blocks and the holding member could extend further if desired.

Bar 132' of FIG. 7 as illustrated does not include a lighting element, although it could if desired. Holding member 158 and lighting element 162 may function like those described above with reference to bar 132. Otherwise, handles 110 and 112 are substantially similar.

Figure 10:
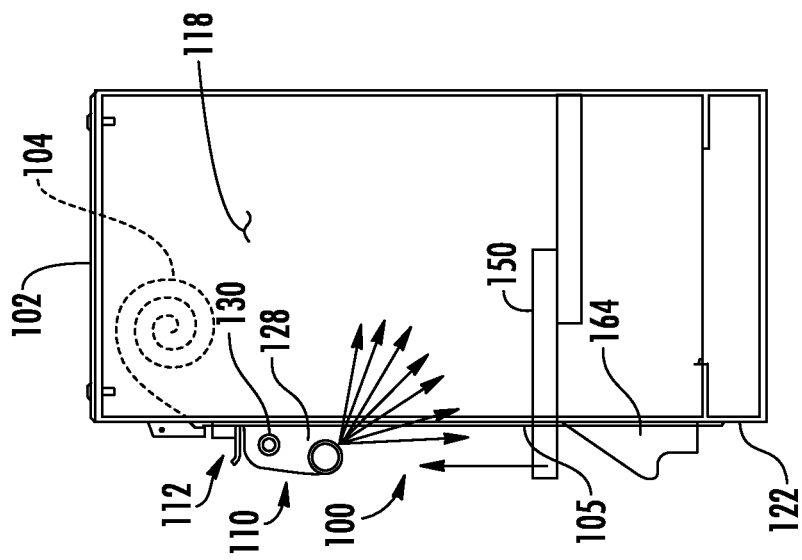
FIGS. 8-10 are side views showing the progressive steps of opening a door and where light impinges.
Figure 9:
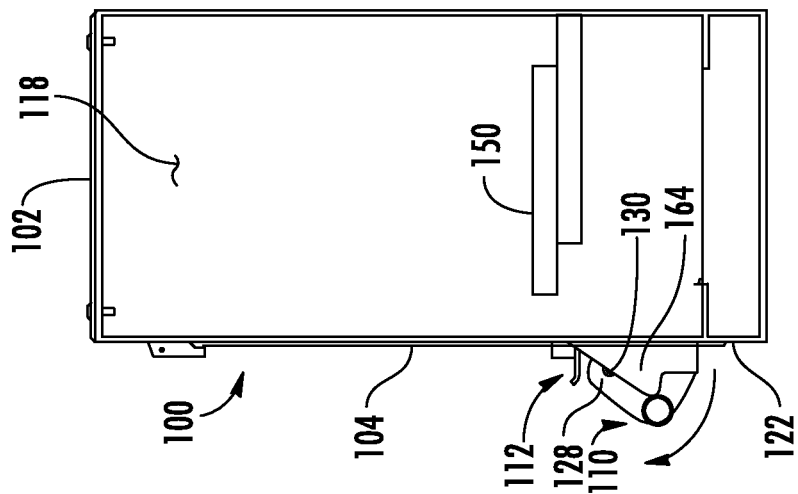
Figure 8:
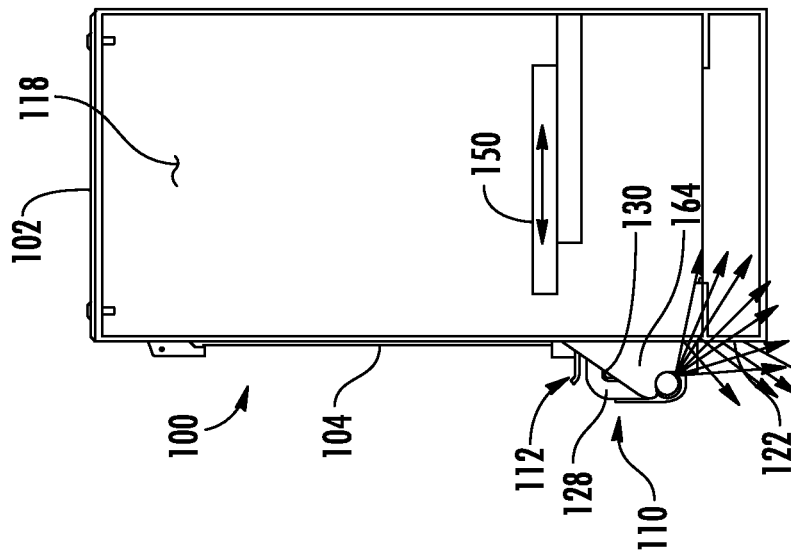

FIGS. 8-10 show the sequence of opening door 104 and where light may impinge if a lighting element is on handle 110. The lighting would be similar if lighting was housed on handle 112. As can be seen, areas within and adjacent compartment 105 and the vehicle in general may be lit using the proposed designs. Retaining elements 164 may be provided to secure handle 110 in place when door 104 is in the closed position.

While preferred embodiments of the invention have been described above, it is to be understood that any and all equivalent realizations of the present invention are included within the scope and spirit thereof. For example, the gripping and lighting sections need not be entirely discrete, and portions of these sections may alternate with one another. Furthermore, the shaped key may be formed as part of the bar that is received by a corresponding opening in the bracket. Thus, the embodiments depicted are presented by way of example only and are not intended as limitations upon the present invention. Thus, while particular embodiments of the invention have been described and shown, it will be understood by those of ordinary skill in this art that the present invention is not limited thereto since many modifications can be made. Therefore, it is contemplated that any and all such embodiments are included in the present invention as may fall within the literal or equivalent scope of the appended claims.

I claim:

1. A lighted roll up door assembly for a compartment defining an interior space having two tracks, each track mounted along a respective outer edge of the interior space, the assembly comprising:
   a roll up door including interconnected slats movable along the tracks, the roll up door being movable between a closed position and an opened position;
   a handle including a bar pivotally mounted to an exterior side of the roll up door so as to pivot around a substantially horizontal axis between a raised position and a lowered position, the bar defining a channel; and
   a lighting element held within the channel mounted so that when the bar is in the lowered position the lighting element directs a beam of light having a center of light output diagonally downward at least about 30 degrees below a horizontal direction and toward the roll up door so as to light a portion of the roll up door and an adjacent area below the roll up door at least partially by reflection when the roll up door is in the closed position and so as to light the interior space when the roll up door is in an opened position, the beam of light having a span of about 30 to about 90 degrees.

2. The assembly of claim 1, wherein the handle includes two pivot blocks pivotally mounted to a slat.

3. The assembly of claim 2, further including two fixed retaining elements mounted adjacent the roll up door and configured to secure the bar when the door is in the closed position to retain the roll up door in the closed position.

4. The assembly of claim 2, wherein the lighting element includes LED's arranged in a row between the pivot blocks.

5. The assembly of claim 1, further including a plate-like member fixedly protruding outwardly from one of the slats, the plate-like member defining a channel, the lighting element being held within the channel.

6. The assembly of claim 5, wherein the lighting element includes LED's arranged in a row.

7. The assembly of claim 6, further including a handle including a pivotally mounted bar attached to two pivot blocks that are attached to a slat.

8. The assembly of claim 7, wherein the LED's are located between the pivot blocks.

9. A lighted roll up door assembly for a compartment defining an interior space, the assembly comprising:
   a roll up door including interconnected slats movable along tracks, each track mounted along a respective outer edge of the interior space;
   a handle including two pivot blocks attached to at least one of the slats of the roll up door, and a bar pivotally mounted to the roll up door via the pivot blocks so as to pivot around a substantially horizontal axis between a raised position and a lowered position, the bar defining a channel; and
   a lighting element located within the channel, the bar being mounted so that when the bar is in the lowered position the lighting element directs a beam of light having a center of light output by the lighting element diagonally downward at least about 30 degrees below a horizontal direction and toward the roll up door so as to light a portion of the roll up door and an adjacent area below the roll up door at least partially by reflection when the roll up door is in the closed position and so as to light the interior space when the roll up door is in an opened position, the beam of light having a span of about 30 to about 90 degrees.

10. The assembly of claim 9, further including two fixed retaining elements mounted adjacent the roll up door and configured to secure the bar when the roll up door is in a closed position to retain the roll up door in a closed position.

11. The assembly of claim 9, wherein the lighting element includes LED's arranged in a row between the pivot blocks.

12. The assembly of claim 9, further including a plate-like member fixedly protruding outwardly from one of the slats, the plate-like member defining a channel, a lighting element being held within the channel.

13. The assembly of claim 12, wherein the lighting element includes LED's arranged in a row.

\* \* \* \* \*